(12) United States Patent
Poniatowski et al.

(10) Patent No.: US 9,573,490 B1
(45) Date of Patent: Feb. 21, 2017

(54) RECLINING SEAT FOR A VEHICLE

(71) Applicants: Jeffrey J Poniatowski, Royal Oak, MI (US); Robert Elton, Ann Arbor, MI (US); Travis D Bechtel, Goodrich, MI (US)

(72) Inventors: Jeffrey J Poniatowski, Royal Oak, MI (US); Robert Elton, Ann Arbor, MI (US); Travis D Bechtel, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/863,562

(22) Filed: Sep. 24, 2015

(51) Int. Cl.
*B60N 2/02* (2006.01)
*B60N 2/20* (2006.01)
*B60N 2/22* (2006.01)
*B60N 2/06* (2006.01)

(52) U.S. Cl.
CPC ............. *B60N 2/0292* (2013.01); *B60N 2/06* (2013.01); *B60N 2/20* (2013.01); *B60N 2/2236* (2013.01); *B60N 2/2245* (2013.01)

(58) Field of Classification Search
CPC ......... B60R 22/04; B60R 22/48; B60N 2/505; B60N 2/525; B60N 2/502; B60N 2/286; B60N 2/2821; B60N 2/2839; B60N 2/3011; B60N 2/01583
USPC .............. 296/65.05, 65.13, 66, 65.03, 65.16; 297/378.12
See application file for complete search history.

(56) References Cited

U.S. PATENT DOCUMENTS

| | | | | |
|---|---|---|---|---|
| 5,671,948 A * | 9/1997 | Susko | ............... | B60R 22/26 280/801.1 |
| 5,918,937 A * | 7/1999 | Moffa | ............... | B60N 2/3047 297/324 |
| 7,270,371 B2 | 9/2007 | Adragna | | |
| 7,374,242 B2 * | 5/2008 | Champ | ............... | B60N 2/3031 296/65.05 |
| 7,559,594 B2 * | 7/2009 | McMillen | ............ | B60N 2/206 296/65.09 |
| 7,568,764 B2 * | 8/2009 | Harper | ............... | B60N 2/045 297/14 |
| 7,611,200 B2 * | 11/2009 | Jovicevic | ............ | B60N 2/2209 297/14 |
| 8,376,442 B1 * | 2/2013 | Brantley | ............ | B60N 2/24 296/65.09 |
| 8,662,561 B2 * | 3/2014 | Runde | ............... | B60N 2/206 296/65.03 |
| 8,770,646 B2 * | 7/2014 | Line | ............... | B60N 2/0232 296/209 |
| 9,333,883 B2 * | 5/2016 | Abe | ............... | B60N 2/3013 |

(Continued)

*Primary Examiner* — Kiran B Patel
(74) *Attorney, Agent, or Firm* — Ralph E. Smith (57) ABSTRACT

A vehicle seat includes a seat base and a seat bottom pivotally coupled to the seat base such that the seat bottom is movable between a seating position, stowed position, and reclined position. A seat guide assembly is configured to couple to a vehicle rear wall, and includes a guide bracket having a slot formed therein and a pin extending through the slot and configured to travel along the slot. The vehicle seat includes a seat back having an upper end, a lower end, and a latch coupled to the upper end. The lower end is pivotally coupled to the seat bottom, and the latch is configured to receive the pin. The seat back upper end travels with the latch and pin along the slot such that the seat back is movable between a seating position, stowed position, and reclined position along a predetermined path relative to the vehicle wall.

19 Claims, 6 Drawing Sheets

(56) References Cited

U.S. PATENT DOCUMENTS

| | | | |
|---|---|---|---|
| 2004/0090102 A1* | 5/2004 | Tame | B60N 2/20 297/378.12 |
| 2004/0183328 A1* | 9/2004 | Daniel | B60N 2/01541 296/65.03 |
| 2006/0214459 A1* | 9/2006 | Kammerer | B60N 2/045 296/65.09 |
| 2007/0252404 A1 | 11/2007 | Muck | |
| 2008/0100112 A1* | 5/2008 | Hausler | B60N 2/2209 297/331 |
| 2009/0273211 A1* | 11/2009 | Hancock | B60N 2/3011 297/13 |
| 2014/0265499 A1* | 9/2014 | Pacolt | B60N 2/20 297/337 |
| 2015/0298582 A1* | 10/2015 | Elton | B60N 2/045 297/340 |

\* cited by examiner

RECLINING SEAT FOR A VEHICLE

FIELD

The present application relates generally to passenger seating for a vehicle and, more particularly, to a reclining rear seat for a vehicle.

BACKGROUND

It is desirable to provide satisfactory passenger comfort for rear seat passengers in vehicles, including pickup trucks. However, increasing passenger comfort for rear seat passengers in pickup trucks has been challenging since the rear wall of the pickup truck cabin may inhibit the ability of the rear seat to recline. Some systems provide rear seats that are fixed in a forward position relative to the rear wall to allow adequate room for the seat back to recline.

However, this arrangement reduces the amount of cargo storage room that would otherwise be available in front of the seat. As such, increasing comfort for rear seating often decreases the available storage space. Accordingly, it is desirable to provide an improved rear seating system for a vehicle.

SUMMARY

In one exemplary aspect of the invention, a vehicle seat is provided. The vehicle seat includes a base and a seat bottom frame pivotally coupled to the base such that the seat bottom frame is movable between a seating position, a stowed position, and a reclined position. A seat guide assembly is configured to couple to a vehicle wall, the seat guide assembly including a guide bracket having a slot formed therein, and a pin extending through the slot and configured to travel along the slot. The vehicle seat includes a seat back frame having an upper end, a lower end, and a latch coupled to the upper end. The lower end is pivotally coupled to the seat bottom frame, and the latch is configured to receive the pin. The seat back frame upper end travels with the latch and pin along the slot such that the seat back frame is movable between a seating position, a stowed position, and a reclined position along a predetermined path relative to the vehicle wall.

In another exemplary aspect of the invention, a vehicle is provided. The vehicle includes a vehicle floor, a vehicle rear wall, and a vehicle seat. The vehicle seat includes a base and a seat bottom frame pivotally coupled to the base such that the seat bottom frame is movable between a seating position, a stowed position, and a reclined position. A seat guide assembly is coupled to the vehicle wall, the seat guide assembly includes a guide bracket having a slot formed therein, and a pin extending through the slot and configured to travel along the slot. The vehicle seat further includes a seat back frame having an upper end, a lower end, and a latch coupled to the upper end. The lower end is pivotally coupled to the seat bottom frame, and the latch is configured to receive the pin. The seat back frame upper end travels with the latch and pin along the slot such that the seat back frame is movable between a seating position, a stowed position, and a reclined position relative to the vehicle wall.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
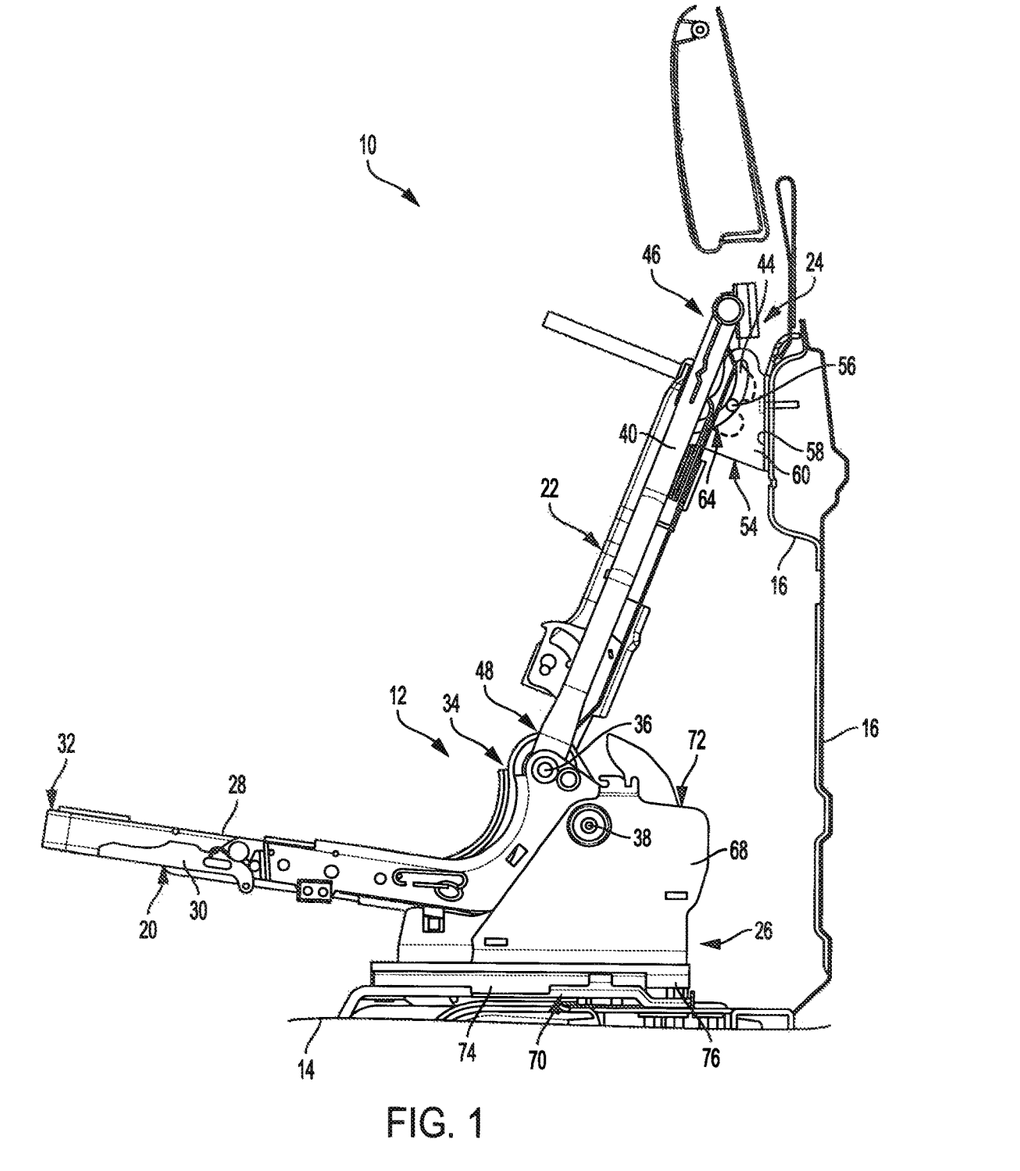
FIG. 1 is a side view of an exemplary vehicle seat system in a first position in accordance with the principles of the present disclosure.
Figure 2:
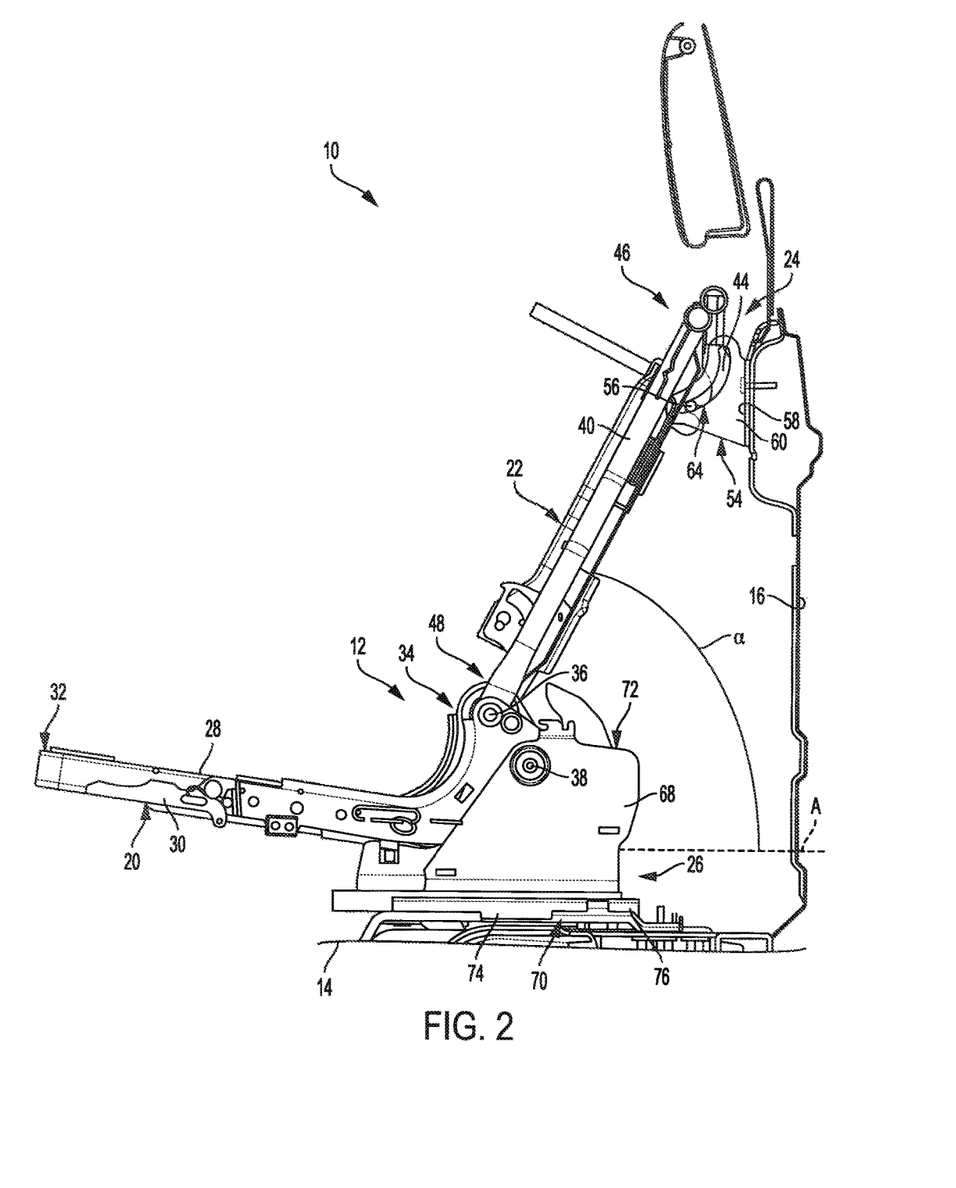
FIG. 2 is a side view of the vehicle seat system shown in FIG. 1 in a second position in accordance with the principles of the present disclosure.
Figure 3:
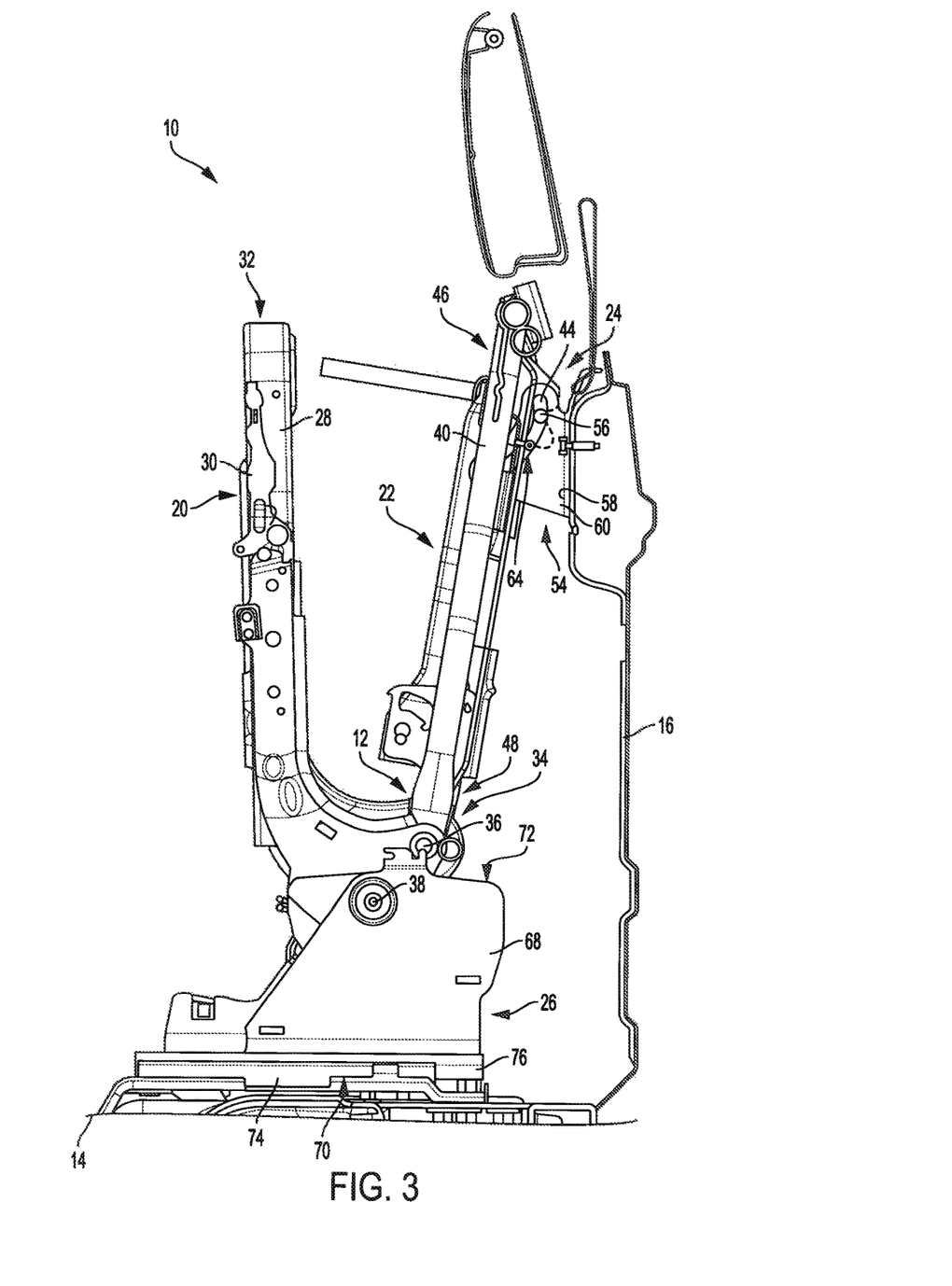
FIG. 3 is a side view of the vehicle seat system shown in FIG. 1 in a third position in accordance with the principles of the present disclosure.

With reference to FIGS. 1-3, an exemplary vehicle seat system 10 according to various aspects of the present disclosure is illustrated. Vehicle seat system 10 includes a vehicle seat 12 coupled to a vehicle floor 14 and a vehicle rear wall 16. In an exemplary embodiment, vehicle seat system 10 is shown as rear seating of a pickup truck. However, vehicle seat system 10 may be used in various other vehicles with rear seating or other seating that is proximate a vehicle wall behind the vehicle seat. Vehicle seat 12 is adjustable between a non-reclined, upright seating position (FIG. 1), a reclined position (FIG. 2), and a stowed position (FIG. 3), as is described herein in more detail.

In the exemplary embodiment shown, vehicle seat 12 generally includes a seat bottom 20, a seat back 22, a seat guide assembly 24, and a seat base adjustment assembly 26.

Seat bottom 20 includes a seat bottom frame 28 and a recline handle 30 rotatably coupled thereto. Seat bottom frame 28 includes a distal or forward end 32 and a proximal or rearward end 34, which is rotatably coupled to seat back 22 at a pivot joint 36. Seat bottom 20 is configured to rotate about a pivot point 38 between the seating position (FIG. 1) and the stowed position (FIG. 3). Seat bottom 20 is further configured to receive a seat bottom pad (e.g., foam) covered in upholstery, soft trim (not shown) or the like.

Figure 4:
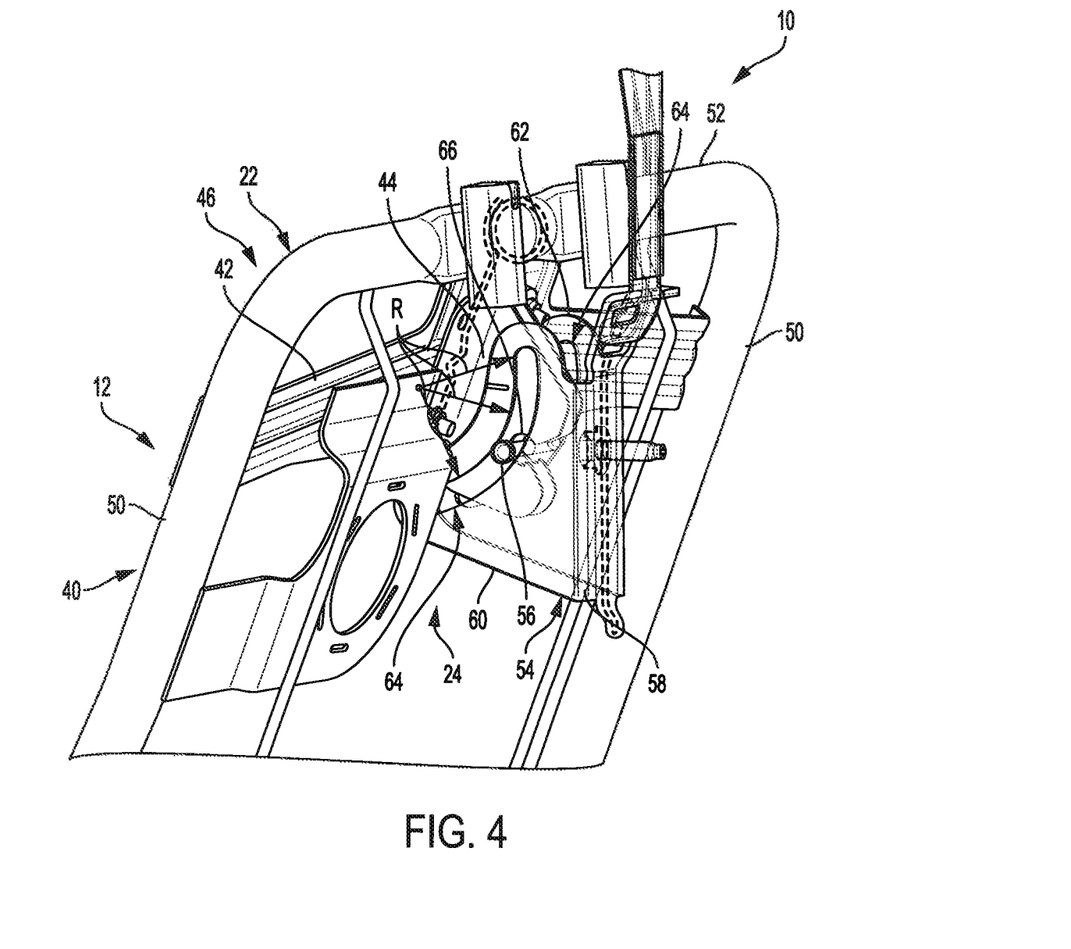
FIG. 4 is a perspective view of an exemplary seat guide assembly of the vehicle seat system shown in FIG. 1 in accordance with the principles of the present disclosure.
Figure 5:
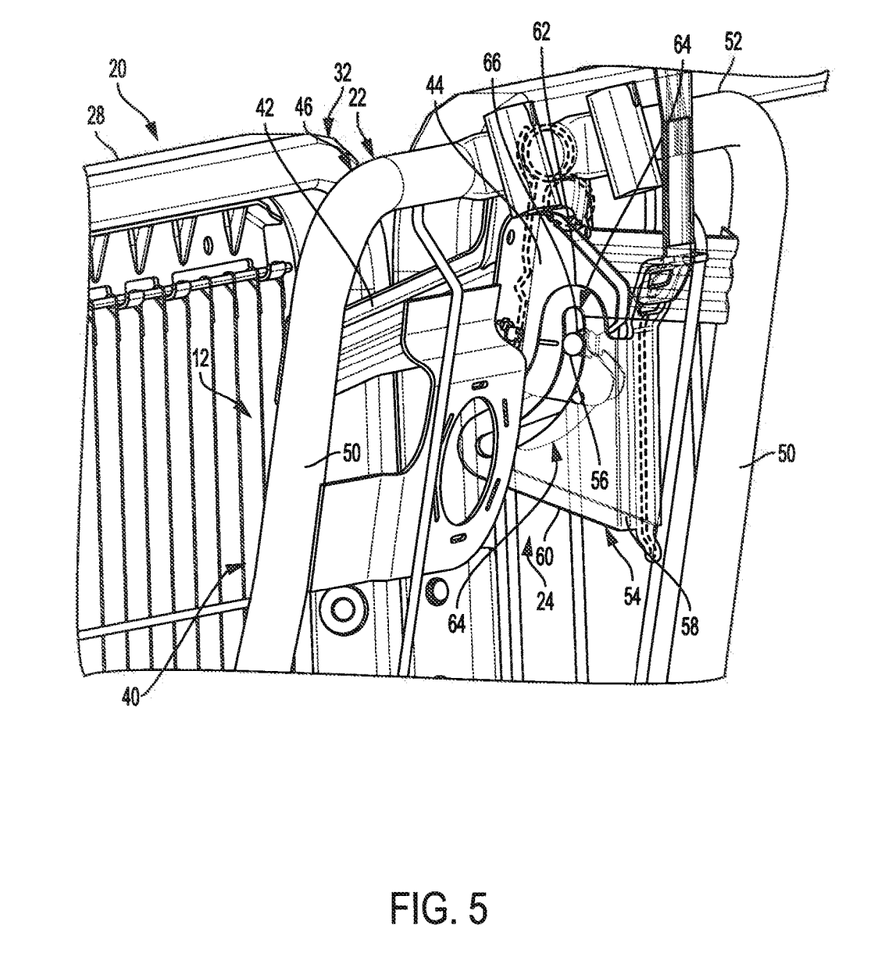
FIG. 5 is a perspective view of the seat guide assembly of the vehicle seat system shown in FIG. 2 in accordance with the principles of the present disclosure.
Figure 6:
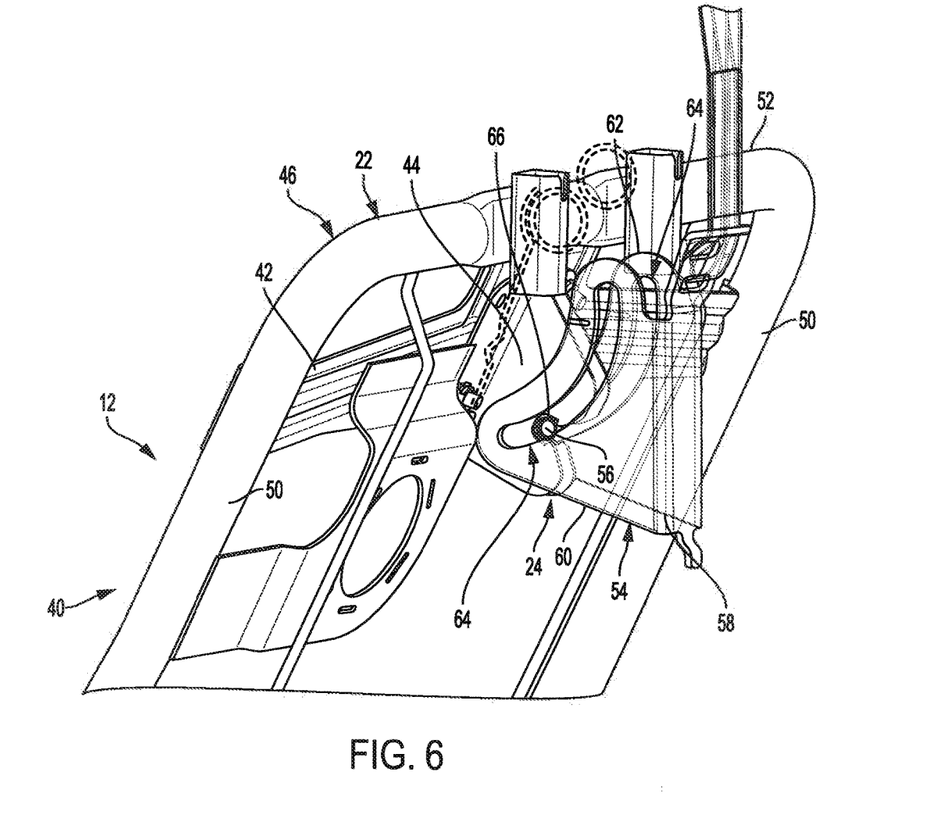
FIG. 6 is a perspective view of the seat guide assembly of the vehicle seat system shown in FIG. 3 in accordance with the principles of the present disclosure.

With additional reference to FIGS. 4-6, seat back 22 includes a seat back frame 40, a cross frame member 42, and a latch 44. Seat back frame 40 includes an upper end 46 and a lower end 48, which is rotatably coupled to seat bottom frame 28 at pivot joint 36. Seat back 22 is configured to receive a seat back pad (e.g., foam) covered in upholstery, soft trim (not shown) or the like.

In the exemplary embodiment, seat back frame 40 includes longitudinal frame members 50 coupled by a lateral frame member 52. Cross frame member 42 is coupled to and extends between adjacent longitudinal frame members 50. Latch 44 is coupled to cross frame member 42 and is operably associated with seat guide assembly 24.

In the exemplary embodiment, seat guide assembly 24 generally includes a guide bracket 54 and a pin 56. As shown in transparent in FIGS. 4-6, guide bracket 54 includes a bracket base 58 and opposed flanges 60, 62 extending therefrom. Bracket base 58 is configured to couple to vehicle rear wall 16, and each of flanges 60, 62 includes a curved slot 64, which receives pin 56 therein. Flanges 60, 62 are laterally spaced apart (cross-car) to provide increased stability to seat back 22 as it moves between the various positions. In one exemplary implementation, vehicle rear wall 16 is directly behind and adjacent to seat back 22. In one exemplary implementation, vehicle rear wall 16 is a rear cabin wall of a pickup truck and seat back 22 is part of a second or rear row seat.

As shown, latch 44 includes a pin receiving slot 66 configured to receive pin 56 such that latch 44 is at least partially disposed between opposed flanges 60, 62 to establish an adjustable connection between seat back frame 40 and seat guide assembly 24. Further, as shown, curved slot 64 has a constant or substantially constant radius 'R' (FIG. 4), thereby enabling a smooth and steady path of travel for pin 56.

As illustrated in FIGS. 4-6, pin 56 is operable to travel along curved slots 64 to adjust the position of seat back 22 relative to vehicle rear wall 16. Seat back 22 is adjustable between the seating position (FIG. 4) where pin 56 is positioned at the midpoint or generally at the midpoint of curved slots 64, the reclined position (FIG. 5) where pin 56 is positioned at the bottom or generally at the bottom of curved slots 64, and the stowed position (FIG. 6) where pin 56 is positioned at the top or generally at the top of curved slots 64.

Accordingly, as pin 56 travels along curved slots 64, a recline angle '$\alpha$' of seat back frame 40 is adjusted relative to a horizontal plane 'A'. Seat back frame 40 may be positioned at various angles '$\alpha$' as pin 56 travels along slots 64. In some embodiments, a predetermined number of locking positions for pin 56 and thus seat 12 may be defined. For example, seat guide assembly 24 may have four locking positions between the seating position and recline position. As such, sliding movement of seat bottom 20 and/or seat base 68 facilitates reclining movement of seat back 22 in a predetermined path spaced apart from and relative to rear wall 16 via seat guide assembly 24.

Seat base adjustment assembly 26 is configured to facilitate movement of vehicle seat 12 between the seating position, the reclined position, and the stowed position in connection with seat guide assembly 24 to maintain the predetermined path of movement spaced apart from and relative to the rear wall 16. Seat base adjustment assembly 26 generally includes a seat base 68, a track latch assembly 70, and a pivot latch assembly 72.

Track latch assembly 70 includes a lower track 74, an upper track 76, and a track release mechanism. Lower track 74 is coupled to vehicle floor 14, upper track 76 is coupled to base 68, and upper track 76 is operably associated with lower track 74 such that base 68 and thus vehicle seat 12 is movable or slidable in the fore and aft directions. The track release mechanism is configured to move between a disengaged first position where the mechanism enables relative sliding movement between lower track 74 and upper track 76, and an engaged second position where the mechanism facilitates preventing relative sliding movement between lower track 74 and upper track 76.

Pivot latch assembly 72 is at least partially an inertial system and is configured to facilitate preventing movement of seat bottom 20 in specific events such as a collision or impact event, but to allow movement of seat bottom 20 during other conditions (e.g., driving or parking). In particular, when seat bottom 20 is in the stowed position (FIG. 3), pivot latch assembly 72 is configured to facilitate preventing movement of seat bottom 20 from the stowed position to the seating position during an impact event (e.g., a front-end collision). Similarly, when seat bottom 20 is in the seating position (FIG. 1), pivot latch assembly 72 is configured to facilitate preventing movement of seat bottom 20 from the seating position to the stowed position during an impact event (e.g., a rear-end collision).

In operation, vehicle seat 12 may be moved from the seating position (FIG. 1) to the reclined position (FIG. 2) when a passenger engages recline handle 30, for example by pulling upward thereon. Manipulation of handle 30 causes track latch assembly 70, which was previously in the engaged position, to disengage thereby enabling sliding movement of seat base 68 and seat bottom 20 toward the front of the vehicle (i.e., toward the left in FIG. 1).

As seat bottom 20 and seat base 68 shift forward, seat back 22 is pulled downward and forward by virtue of its connection to seat bottom 20 at pivot joint 36. This movement is directed and controlled by the connection between latch 44 and pin 56 as pin 56 travels along curved slots 64, which facilitates a smooth, steady, and pleasing recline of vehicle seat 12. As such, the passenger can orient seat back 22 at multitudes of desired recline angles '$\alpha$' anywhere along the curved slot 64. When seat back 22 is positioned at the desired recline angle '$\alpha$', the passenger may then release recline handle 30, thereby causing track latch assembly 70 to engage and prevent sliding movement of seat base 68 and seat bottom 20.

Movement of vehicle seat 12 from the seating position (FIG. 1) to the stowed position (FIG. 3) may be initiated by a passenger applying a lifting force to seat bottom 20. Rotational movement of seat bottom 20 about pivot point 38 causes track latch assembly 70, which was previously in the engaged position, to disengage thereby enabling sliding movement of seat base 68 toward the rear of the vehicle (i.e., toward the right in FIG. 1). In one embodiment, seat 12 may include biasing mechanism such as a spring (not shown) to pull seat base 68 rearward to ensure that seat 12 moves to the furthest rearward position on tracks 74, 76 before they re-lock.

As seat base 68 shifts rearward and seat bottom 20 rotates toward (or against) seat back 22, seat back 22 is pushed upward and seat back lower end 48 is moved rearward toward vehicle rear wall 16. This movement is directed and controlled by the connection between latch 44 and pin 56 as pin 56 travels along curved slots 64, which facilitates a smooth, steady, and pleasing stowing of vehicle seat 12. When seat bottom 20 and/or seat back 22 are in the desired position (e.g., the stowed position), track latch assembly 70 may be automatically engaged or engaged by the passenger to facilitate preventing sliding movement of seat base 68. In this position, pivot latch assembly 72 may be configured to facilitate preventing rotational movement of seat bottom 20 back down toward vehicle floor 14. Moreover, vehicle seat 12 may be moved from the reclined position (FIG. 2) to the stowed position (FIG. 3) in a manner similar to the movement described from the seating position to the stowed position.

Described herein are systems and methods for providing a reclining seat for a vehicle. The systems include a seat back coupled to a vehicle rear wall through a latch and seat guide assembly. The seat guide assembly includes a bracket having curved slots of a substantially constant radius to receive a pin operably associated with the latch. The system includes a seat bottom coupled to the seat back, and as the seat bottom is slidingly adjusted along the vehicle floor, the seat back is moved to various positions such as reclining and stowed positions. The latch and seat guide assembly enable the vehicle seat to be quickly and easily installed into the vehicle and facilitate providing smooth and steady movement of the vehicle seat between seated, reclined, and stowed positions.

It will be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle seat comprising:
   a seat base;
   a seat bottom frame pivotally coupled to the seat base such that the seat bottom frame is movable between a seating position, a stowed position, and a reclined position;
   a seat guide assembly configured to couple to a vehicle wall, the seat guide assembly including a guide bracket having a slot formed therein, and a pin extending through the slot and configured to travel along the slot; and
   a seat back frame having an upper end, a lower end, and a latch coupled to the upper end, wherein the lower end is pivotally coupled to the seat bottom frame, and the latch is configured to receive the pin,
   wherein the seat back frame upper end travels with the latch and pin along the slot such that the seat back frame is movable between a seating position, a stowed position, and a reclined position along a predetermined path relative to the vehicle wall.

2. The vehicle seat of claim 1, wherein the guide bracket comprises a bracket base configured to couple to the vehicle wall, and a pair of opposed spaced apart flanges extending from the bracket base, each of the opposed flanges including the slot, the pin positioned in the slot of each flange and extending between the opposed flanges.

3. The vehicle of claim 2, wherein the latch is positioned between the opposed flanges, the latch including a pin receiving slot configured to receive the pin to movably couple the seat back frame to the vehicle wall.

4. The vehicle seat of claim 1, wherein the slot is curved.

5. The vehicle seat of claim 4, wherein the curved slot has a substantially constant radius.

6. The vehicle seat of claim 1, further comprising a seat base adjustment assembly configured to move the base between a seating position, a stowed position, and a reclined position.

7. The vehicle seat of claim 6, wherein the seat bottom is configured to rotate upward toward the seat back to a stowed position.

8. The vehicle seat of claim 7, wherein the seat base adjustment assembly comprises a pivot latch assembly to facilitate preventing the seat bottom from rotating from the stowed position back down toward a floor of the vehicle.

9. The vehicle seat of claim 6, wherein the seat base adjustment assembly comprises a lower track, an upper track, and a track release mechanism, the lower track configured to couple to a vehicle floor, the upper track coupled to the base and operably associated with the lower track such that the base is slidable between the seating position, the stowed position, and the reclined position.

10. The vehicle seat of claim 9, wherein the track release mechanism is configured to move between a disengaged first position where the track release mechanism enables relative sliding movement between the lower track and the upper track, and an engaged second position where the track release mechanism facilitates preventing relative sliding movement between the lower track and the upper track.

11. A vehicle comprising:
    a vehicle floor;
    a vehicle cabin rear wall; and
    a vehicle seat, the vehicle seat comprising:
      a seat base;
      a seat bottom frame pivotally coupled to the seat base such that the seat bottom frame is movable between a seating position, a stowed position, and a reclined position;
      a seat guide assembly coupled to the vehicle wall, the seat guide assembly including a guide bracket having a slot formed therein, and a pin extending through the slot and configured to travel along the slot; and
      a seat back frame having an upper end, a lower end, and a latch coupled to the upper end, wherein the lower end is pivotally coupled to the seat bottom frame, and the latch is configured to receive the pin,
      wherein the seat back frame upper end travels with the latch and pin along the slot such that the seat back frame is movable between a seating position, a stowed position, and a reclined position along a predetermined path relative to the vehicle rear wall.

12. The vehicle of claim 11, wherein the guide bracket comprises a bracket base configured to couple to the vehicle rear wall, and a pair of opposed spaced apart flanges extending from the bracket base, each of the opposed flanges including the slot, the pin positioned in the slot of each flange and extending between the opposed flanges.

13. The vehicle of claim 12, wherein the latch is positioned between the opposed flanges, the latch including a pin receiving slot configured to receive the pin to movably couple the seat back frame to the vehicle wall.

14. The vehicle of claim 11, wherein the slot is curved and has a substantially constant radius.

15. The vehicle of claim 11, further comprising a seat base adjustment assembly configured to move the base between a seating position, a stowed position, and a reclined position.

16. The vehicle of claim 15, wherein the seat bottom is configured to rotate upward toward the seat back to a stowed position.

17. The vehicle of claim 16, wherein the seat base adjustment assembly comprises a pivot latch assembly to facilitate preventing the seat bottom from rotating from the stowed position back down toward the floor of the vehicle.

18. The vehicle of claim 15, wherein the seat base adjustment assembly comprises a lower track, an upper track, and a track release mechanism, the lower track configured to couple to the vehicle floor, the upper track coupled to the base and operably associated with the lower track such that the base is slidable between the seating position, the stowed position, and the reclined position.

19. The vehicle of claim 18, wherein the track release mechanism is configured to move between a disengaged first position where the track release mechanism enables relative sliding movement between the lower track and the upper track, and an engaged second position where the track release mechanism facilitates preventing relative sliding movement between the lower track and the upper track.

\* \* \* \* \*